(12) United States Patent
Kuchuk-Katalan et al.

(10) Patent No.: US 11,976,903 B2
(45) Date of Patent: May 7, 2024

(54) ARMOR ASSEMBLY WITH A PERFORATED LAYER

(71) Applicant: PLASAN SASA LTD., Kibbutz Sasa (IL)

(72) Inventors: Itzhak Kuchuk-Katalan, Kibbutz Dafna (IL); Zvika Asaf, Kibbutz Afek (IL); Uri Solomon, Kibbutz Kabri (IL); Edan Lazarson, Lower Galilee (IL); Dmitry Naroditsky, Tzur Yitzhak (IL)

(73) Assignee: PLASAN SASA LTD., Kibbutz Sasa (IL)

( * ) Notice: Subject to any disclaimer, the term of this patent is extended or adjusted under 35 U.S.C. 154(b) by 105 days.

(21) Appl. No.: 17/796,121

(22) PCT Filed: Jan. 21, 2021

(86) PCT No.: PCT/IL2021/050067
§ 371 (c)(1),
(2) Date: Jul. 28, 2022

(87) PCT Pub. No.: WO2021/156850
PCT Pub. Date: Aug. 12, 2021

(65) Prior Publication Data
US 2023/0098636 A1 Mar. 30, 2023

(30) Foreign Application Priority Data
Feb. 6, 2020 (IL) .......................................... 272508

(51) Int. Cl.
*F41H 7/04* (2006.01)
*B32B 3/06* (2006.01)
(Continued)

(52) U.S. Cl.
CPC ............... *F41H 7/042* (2013.01); *B32B 3/06* (2013.01); *B32B 3/266* (2013.01); *B32B 5/02* (2013.01);
(Continued)

(58) Field of Classification Search
CPC ......... F41H 7/042; F41H 5/0464; B32B 7/05; B32B 3/06; B32B 3/266; B32B 5/02;
(Continued)

(56) References Cited

U.S. PATENT DOCUMENTS 3,770,560 A * 11/1973 Elder ........................ B32B 3/30
428/116
6,221,507 B1 * 4/2001 Gewelber ............ B23K 35/002
228/252

(Continued)

FOREIGN PATENT DOCUMENTS

EP 1910071 A1 4/2008

*Primary Examiner* — Samir Abdosh
(74) *Attorney, Agent, or Firm* — Dorsey & Whitney LLP

(57) ABSTRACT

An armor assembly for mounting to a vehicle to protect it from an expected explosion. The assembly comprises at least two layers, each contacting an adjacent layer. One of said layers is a perforated layer and another one is a covering layer. The perforated layer is made of a material of a first density, and having a first surface configured to face towards the vehicle when the armor assembly is mounted thereto, and a second surface opposite thereto. The perforated layer is formed with holes each having an opening at least at said second surface. The covering layer is made of a material of a second density which is greater than the first density and is configured to be permanently bent by said explosion into the openings, at opening covering portions of the covering layer, to such a depth as to restrict sliding movement at least between the two layers.

15 Claims, 4 Drawing Sheets

(51) Int. Cl.
  *B32B 3/26* (2006.01)
  *B32B 5/02* (2006.01)
  *B32B 7/05* (2019.01)
  *F41H 5/04* (2006.01)
  *B32B 15/04* (2006.01)
  *B32B 15/14* (2006.01)
  *B32B 15/18* (2006.01)
  *B32B 15/20* (2006.01)
(52) U.S. Cl.
  CPC ............ *B32B 7/05* (2019.01); *F41H 5/0464* (2013.01); *B32B 15/043* (2013.01); *B32B 15/14* (2013.01); *B32B 15/18* (2013.01); *B32B 15/20* (2013.01); *B32B 2307/54* (2013.01); *B32B 2307/558* (2013.01); *B32B 2571/02* (2013.01)
(58) Field of Classification Search
  CPC ....... B32B 15/043; B32B 15/14; B32B 15/18; B32B 15/20; B32B 2307/54; B32B 2307/558; B32B 2571/02

USPC ....................................................... 89/36.02
  See application file for complete search history.

(56) References Cited

U.S. PATENT DOCUMENTS 9,097,495 B1* 8/2015 Kesterson ............... F41H 5/045
  2010/0251883 A1* 10/2010 Naroditsky ............ B60N 3/048
   89/36.02
  2011/0067183 A1* 3/2011 Hawkins .................. B32B 7/12
   156/60
  2012/0192705 A1* 8/2012 Hansen ................ F41H 5/0435
   156/243
  2013/0236691 A1* 9/2013 Calkins .................... C08J 9/103
   428/220
  2020/0234686 A1* 7/2020 Hosoda .................. B32B 5/245
  2020/0291645 A1* 9/2020 Scamardo ............... B32B 5/028

* cited by examiner

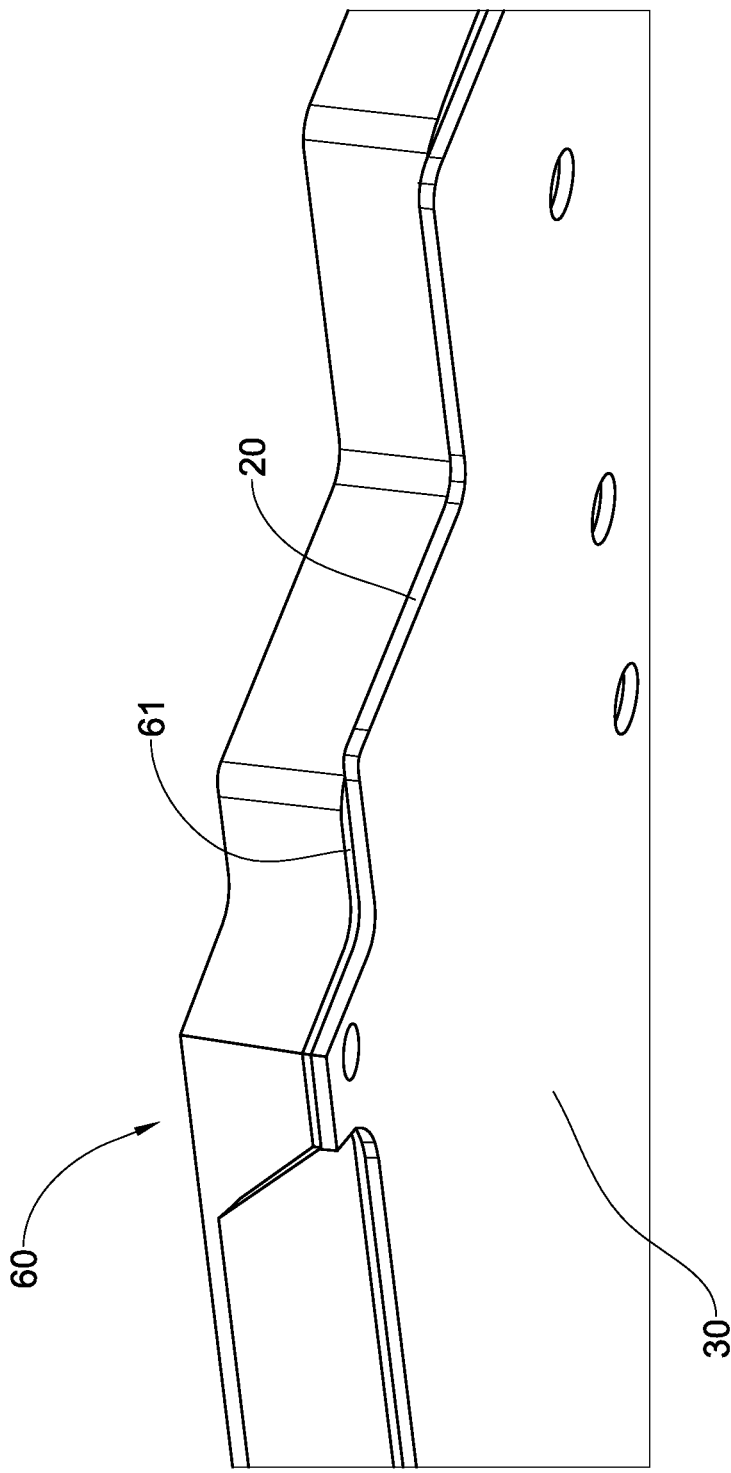

ARMOR ASSEMBLY WITH A PERFORATED LAYER

TECHNOLOGICAL FIELD

The presently disclosed subject matter relates to armor assemblies, and in particular to armor assemblies for mounting on vehicles.

BACKGROUND

Known in the art armor assemblies for mounting on a target such as a vehicle, generally comprise a single thick plate having sufficient moment of inertia which allows it to effectively resist deformation, so as to protect the respective vehicle from a nearby explosion.

In order to minimize a negative effect such armor assemblies have on the performance of the vehicle, the plate is usually made of a light weight metal, such as aluminum or titanium, a light weight metal alloy, or of other light weight material such as ceramics.

Despite the use of light weight materials, such armor assemblies are still considered heavy.

GENERAL DESCRIPTION

It is a purpose of the presently disclosed subject matter to teach a light weight armor assembly, capable of demonstrating similar resistance to deformation caused by a nearby explosion, to those known in the art.

According to a first aspect of the presently disclosed subject matter there is provided an armor assembly configured to be mounted to a vehicle to protect it from an expected explosion. The armor assembly comprises two or more layers each contacting an adjacent one of said layers, one of the layers being a perforated layer and another one of said layers being a covering layer.

The term 'expected explosion' as used herein the specification and claims, refers to an explosion associated with an anticipated threat, particularly, the largest anticipated threat, which the vehicle is expected to be facing in its field of combat, i.e., where the vehicle is stationed, e.g., an explosion associated with the size and positioning of a typical IED in that field of combat, typical landmine in that field of combat, etc.

The perforated layer is made of a material of a first density, and has a first surface configured to face in a direction towards the vehicle when the armor assembly is mounted thereto, and a second surface opposite thereto.

The perforated layer is formed with a plurality of holes each having an opening at least at said second surface.

The holes can be blind holes or through holes having an opening also on the first surface. The holes can be circular, e.g., bores/drills, or be formed in any other shape such as oval or rectangular.

The covering layer is made of a material of a second density which is greater than the first density and is configured to be permanently bent by the expected explosion into said openings to such a depth as to restrict sliding movement at least between the two layers at opening covering portions positioned in register with the openings.

According to second aspect of the presently disclosed subject matter there is provided a vehicle comprising a vehicle belly positioned under a passenger cabinet thereof, and an armor assembly as described hereinabove positioned underneath the belly.

Any one or more of the following features, designs and configurations can be applied in an armor assembly, or in a vehicle, according to the present disclosure, separately or in various combinations thereof:

The armor assembly being can be configured to be attached to an auxiliary layer made of a material having a density greater than the first density, such that said perforated layer is disposed between the covering layer and said auxiliary layer.

Each of the openings can have a diameter at least as large as the thickness of its respective opening covering portion, more particularly at least two times as large, and even more particularly at least three times as large.

The layers can be connected by fasteners.

The armor assembly can further comprise an intermediate layer positioned between the perforated layer and the covering layer, made of a material having a third density which is smaller than said first density.

The intermediate layer is made of fabric.

Respective portions of the intermediate layer can be configured to be bent into the openings together with said covering portions.

The covering layer can be made of a material having yield stress larger than 700 MPA.

The auxiliary layer can be made of a material having yield stress larger than 700 MPA.

The holes can be through holes extending between the first and second surfaces.

The armor assembly can further comprise the auxiliary layer.

The third density can be the same as the second density.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 4 illustrates a further example of the presently disclosed subject matter.

DETAILED DESCRIPTION OF EMBODIMENTS

Figure 1:
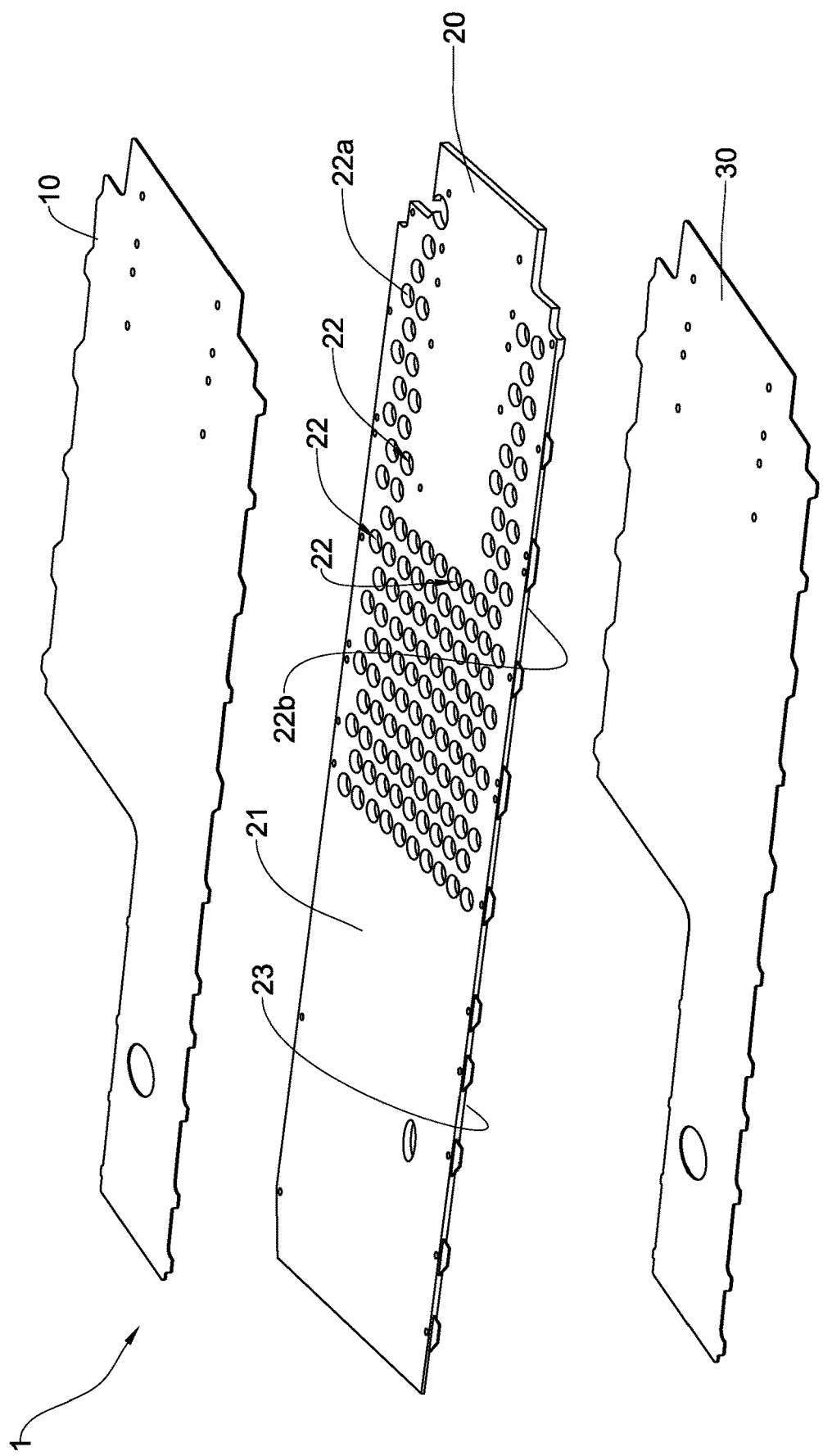
FIG. 1 is an exploded view of an armor assembly according to one example of the presently disclosed subject matter.

FIG. 1 schematically illustrates an exploded view of an armor assembly 1 according to one example of the presently disclosed subject matter, configured to be mounted to a vehicle, i.e. to a belly thereof, so as to protect the vehicle from explosions which can occur under it, e.g., a landmine explosion, a buried improvised explosive device (IED) explosion, or an explosion resulting from any other explosive threat which is buried, placed on the surface of the ground, or configured to explode in proximity to the surface of the ground.

The armor assembly 1 shown in FIG. 1 is made of three layers securely attached to each other to form a single unified structure configured to sufficiently resist deformation, as to protect the vehicle from an expected explosion, for example, a 6 kg TNT explosion, or bigger, with fragments, occurring 0.5 meter below the bottom layer in the normal direction. Particularly, the armor assembly 1 can be lighter than an armor consisting of a single layer made of a material selected from any those of the above layers and having such a thickness as to provide similar protection capabilities.

The armor assembly 1 comprises an upper layer configured to be positioned most proximal to the vehicle when the armor assembly is mounted thereto, constituted by an upper armor plate 10, a bottom layer configured to be positioned most distal from the vehicle when the armor assembly is mounted thereto, constituted by a bottom armor plate 30, and a middle layer sandwiched therebetween, constituted by a perforated middle armor plate 20 formed with lighting holes 22 therein, facilitating light weight to the armor assembly 1. In other embodiments of the presently disclosed subject matter, the layers can be constituted by elements other than armor plates shown in FIG. 1, for example, the bottom layer can be constituted by a V-shaped blast deflecting element.

It should be appreciated that the moment of inertia of the unified structure is effected by the ability of the unified structure to remain intact during the explosion, i.e., the ability of the plates 10, 20, 30, to operate in conjunction during the explosion, and maintain the armor assembly 1 intact.

In this example, the lighting holes 22 are through holes extending between a first opening disposed 22a on a first surface 21 of the perforated plate 20 configured to be covered by the upper armor plate 10, and a second opening 22b disposed on a second surface 23 opposite to the first surface 21, configured to be covered by the bottom armor plate 30. It should be appreciated that in other embodiments of the presently disclosed subject matter, these holes can be blind holes having an opening only on the second surface 23.

Figure 2:
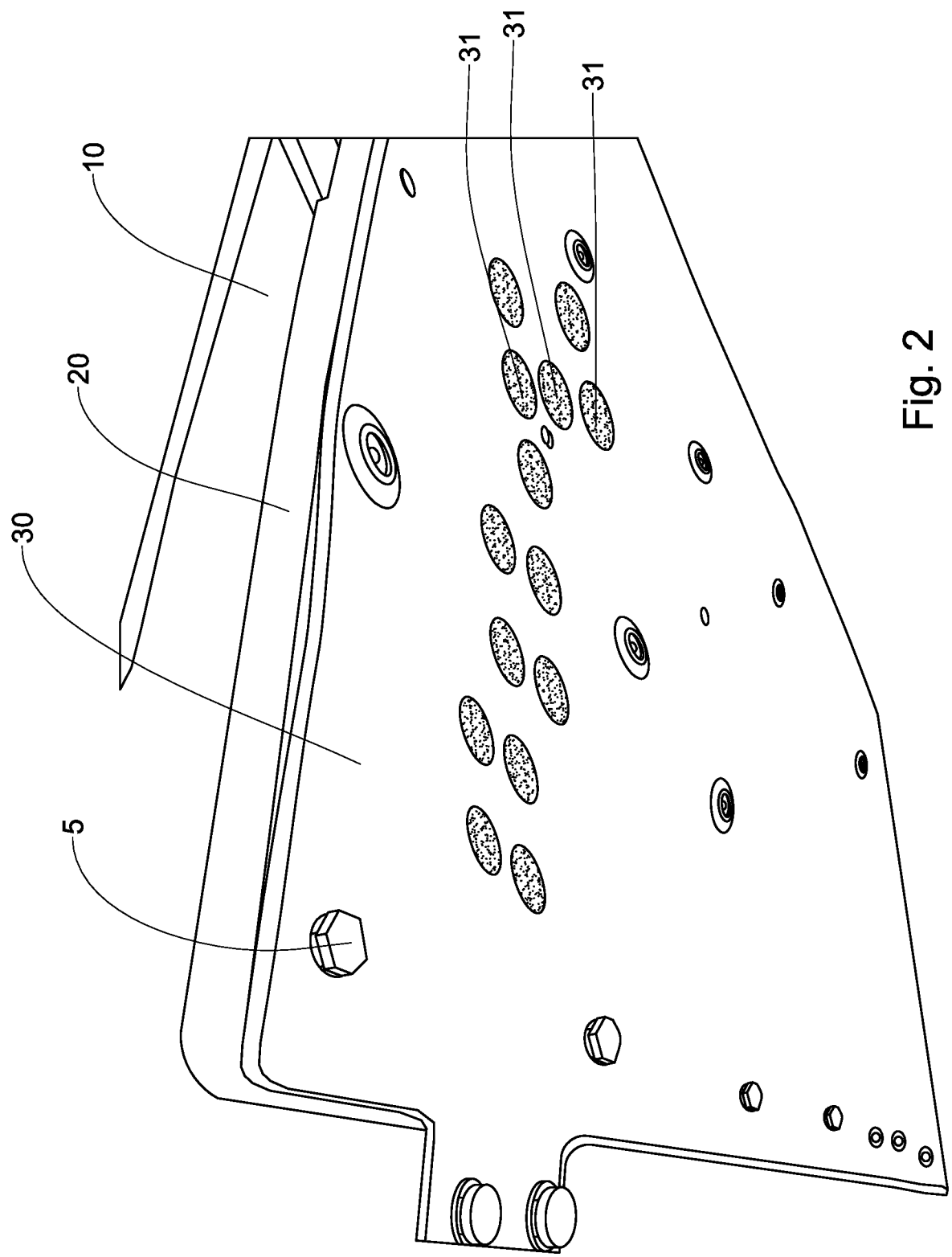
FIG. 2 illustrates an armor assembly of the kind shown in FIG. 1, after an impact of an explosion.

The three plates, 10, 20, 30, are securely connected to each other by fasteners i.e., bolts 5, seen in FIG. 2, which hold them together to keep the unified structure intact. In general, prior to the expected explosion, the bolts 5 bare merely pressure and tension stresses, however, during the expected explosion the bolts 5 can also bare substantial shear stresses which put them at greater risk of failing. The structure and characteristics of the perforated and bottom plates 20, 30, e.g., density, yield stress, rigidity, thickness, as well as the size of the openings 22a, are configured as to maintain the armor plate 1 intact during explosion, and prevent major shear stresses from developing in the bolts 5, as will be explained hereinafter.

Figure 3:
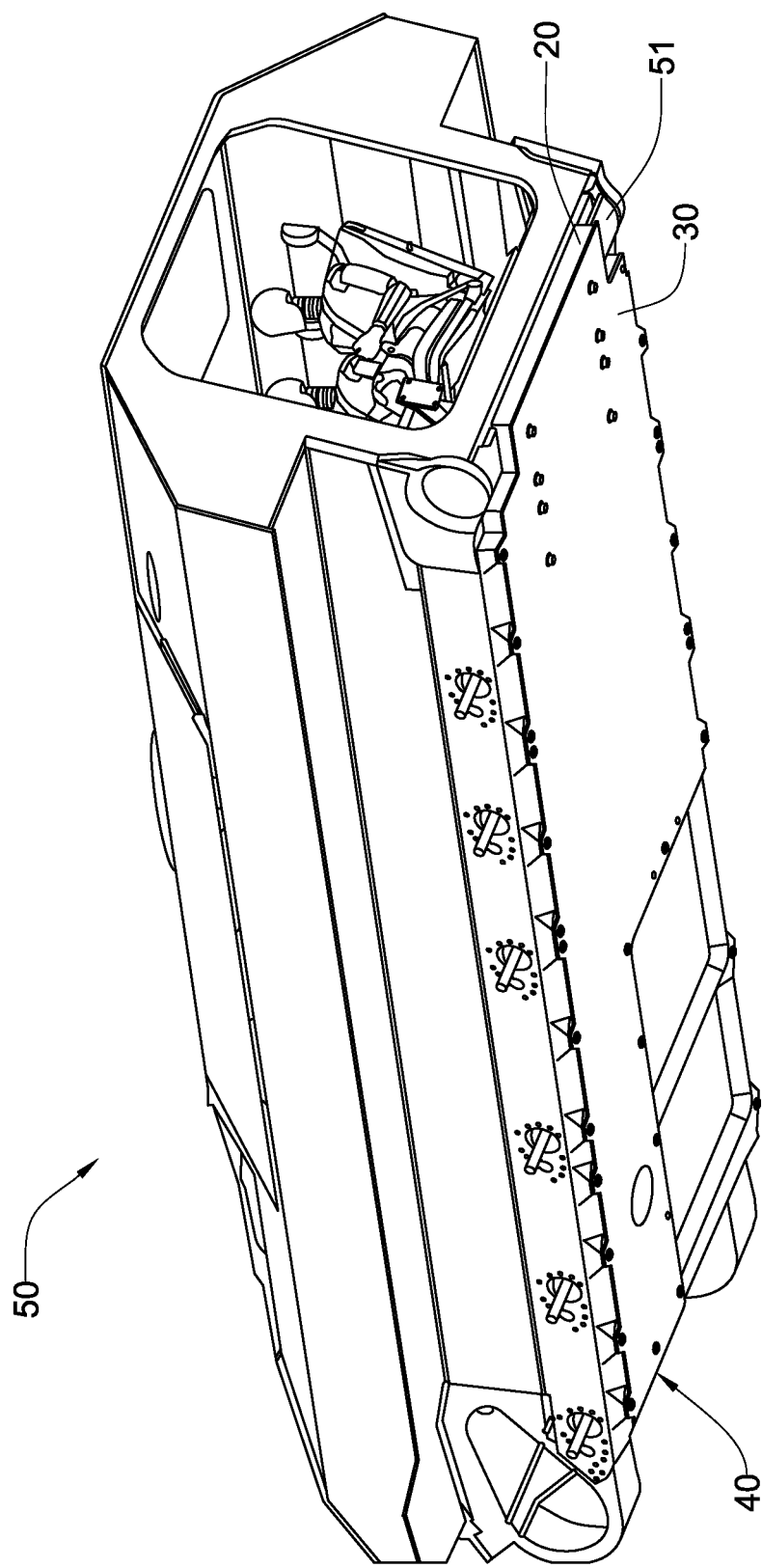
FIG. 3 illustrates an armor assembly according to another example of the presently disclosed subject matter, mounted to a vehicle.

During the expected explosion, the bottom plate 30 is pressed against the perforated plate 20 which in turn is pressed against the upper plate 10. Thickness of the bottom plate 30, as well as the diameter of the openings 22b of the holes 22, are selected so as to allow portions 31 of the bottom plate 30 covering the second openings 24 to be bent thereinto, as seen in FIG. 3, during, and remain permanently bent after, the expected explosion.

In particular, each of the second openings 22b, i.e., each of said holes 22, can have a diameter which is not less than the thickness of the bottom plate 30. In the present example, the diameter of the openings is equal to the thickness of the bottom plate. In other embodiments of the presently disclosed subject matter, the diameter of the openings 22b can exceed the thickness of the bottom plate 30, e.g. the former can be at least two times greater than the latter.

In any case, the two layers are configured so as to allow the portions 31 of the bottom layer 30 to enter the holes 22 to a depth sufficient to effectively unify the two plate 20 and 30, thereby contributing to the overall intactness of the armor assembly 1, and restricting sliding movement between the two plates 20 and 30, as a result of the expected explosion, thereby restricting shear stresses from developing in the bolts 5.

The characteristics of the materials from which the plates 10, 20, 30 are made of can be selected according to their function at a time of the expected explosion. In that way, the bottom plate 30, being the first plate to encounter the explosion, can be made of a material having sufficient yield stress to keep it from yielding under loads of the explosion, e.g., 700 MPA or larger, such as steel. The two other layers 20, 10 can be made of lighter materials, i.e., materials having a density which is smaller than that of the bottom plate 30, such as aluminum, to further facilitate light weight to the armor assembly 1. Such materials can be configured to merely maintain the shape and size of the unified structure to maintain its moment of inertia during the explosion.

In order to facilitate the effect of bending into the openings 22, the bottom plate 30 can be made of a material having a yield stress of no more than 1700 MPA.

The thickness of the plates 10, 20, 30 can be selected according the material from which they are made of, the function of the respective layer during the expected explosion, and the intensity of the expected explosion. Thus, for the given expected explosion, i.e., a 6 kg TNT explosion, or greater, with fragments, occurring 0.5 meter below the bottom layer in the normal direction, the thickness of the first plate can be 8 mm, the thickness of the second plate can be 15 mm and the thickness of the third plate can be 10 mm.

Certain vehicles, particularly APCs comprise an armored portion, optionally in the area of a belly thereof, which can constitute the upper layer of the armor assembly according to the presently disclosed subject matter. Thus, a two layer armor assembly can be appreciated, comprising merely the bottom and middle layers as described, which utilizes the armored portion of the vehicle on which it is mounted as the upper layer thereof.

FIG. 3 illustrates another example of the presently disclosed subject matter, in which an armor assembly 40 is mounted to a belly 51 of an armored personnel carrier (APC) 50, so as to protect the APC 50 from threats approaching therebelow.

The armor assembly 40 comprises two layers identical to the middle and bottom plates 30 and 20 of the armor assembly 1, whereas the vehicle belly 51 constitutes an upper layer, i.e., replacing the plate 10.

The vehicle belly 51 of this particular APC 50 (i.e., M113 fighting vehicle) has similar characteristics to that of the upper plate 10, i.e., made of 25 mm aluminum, rendering it capable of functioning as the upper layer of the armor assembly 40, to protect the APC 50 against the aforementioned expected explosion, e.g., a 6 kg TNT explosion, or lerger, with fragments, occurring 0.5 meter below the bottom layer in the normal direction.

According to a further example of the presently disclosed subject matter, an intermediate layer can be sandwiched between each pair of adjacent layers in any one of the armor assemblies illustrated herein, to facilitate stress distribution between the two adjacent layers, the intermediate layer being capable of bending into holes of the perforated layer together with the corresponding areas of the bottom layer. To achieve that, the intermediate layer can have a density smaller than each of the densities of the two layers sandwiching it.

FIG. 4 illustrates an armor assembly 60 with such an intermediate layer 61 made of fabric, sandwiched between the bottom plate 30 and the perforated plate 20.

In all the above examples, the bottom layer constitutes a covering layer for the perforated layer, and its portions covering, directly or indirectly, the holes in the perforated layer, constitute opening covering portions.

Whilst in the above examples, the covering layer is shown as having a uniform structure, in which the opening covering portions are distinguished from the remainder of the covering layer only in that they cover the holes in the perforated layer directly or indirectly, in other embodiments of the presently disclosed subject matter, the covering layer can be formed with opening covering portions also having a configuration facilitating their bending into the holes of the perforated layer.

The invention claimed is:

1. An armor assembly configured to be mounted to a vehicle to protect the vehicle from an expected explosion, said armor assembly comprising:
   at least two layers each of which contacts an adjacent one of said at least two layers, one of said at least two layers being a perforated layer and another one of said at least two layers being a covering layer;
   wherein said perforated layer is made of a material of a first density, and having a first surface configured to face in a direction towards the vehicle when the armor assembly is mounted thereto, and a second surface opposite thereto, said perforated layer being formed with a plurality of holes each having an opening at least at said second surface;
   wherein said covering layer is made of a material of a second density that is greater than said first density and configured to be permanently bent by said explosion into the openings, at opening covering portions of the covering layer, to such a depth as to restrict sliding movement at least between the at least two layers.

2. The armor assembly of claim 1, wherein said armor assembly is configured to be attached to an auxiliary layer made of a material having a density equal or greater than said first density, such that said perforated layer is disposed between said covering layer and said auxiliary layer.

3. The armor assembly of claim 1, wherein each of said openings has a diameter at least as large as a thickness of the covering layer at least at an area thereof constituting the respective opening covering portion, and optionally being at least two times as large as said thickness.

4. The armor assembly of claim 1, wherein each of said openings has a diameter at least two times as large as said thickness.

5. The armor assembly of claim 1, wherein said at least two layers are connected by fasteners.

6. The armor assembly of claim 1, further comprising an intermediate layer positioned between said perforated layer and said covering layer, made of a material having a third density which is smaller than said first density.

7. The armor assembly of claim 6, wherein said intermediate layer is made of fabric.

8. The armor assembly of claim 6, wherein respective portions of said intermediate layer are configured to be bent into the openings together with said covering portions.

9. The armor assembly of claim 1, wherein said covering layer is made of a material having yield stress larger than 700 MPa.

10. The armor assembly of claim 1, wherein said plurality of holes are through holes extending between said first and second surfaces.

11. The armor assembly of claim 1, wherein said auxiliary layer constitutes a part of said assembly configured to be mounted to a vehicle.

12. The armor assembly of claim 5, wherein said third density is the same as said second density.

13. The armor assembly of claim 1, configured to be mounted to and underneath a belly of the vehicle.

14. A vehicle, comprising:
   a vehicle belly positioned under a passenger cabinet thereof; and
   an armor assembly of claim 1 positioned underneath said belly.

15. The vehicle of claim 14, wherein an area of the belly under which the armor assembly is mounted constitutes said auxiliary layer.

* * * * *